US008001895B2

(12) United States Patent
Schneider et al.

(10) Patent No.: US 8,001,895 B2
(45) Date of Patent: Aug. 23, 2011

(54) INKING UNIT OF A ROTARY PRESS, COMPRISING A FILM ROLLER

(75) Inventors: Georg Schneider, Würzburg (DE); Bernd Kurt Masuch, Kürnach (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 335 days.

(21) Appl. No.: 12/227,589

(22) PCT Filed: Apr. 17, 2007

(86) PCT No.: PCT/EP2007/053701

§ 371 (c)(1), (2), (4) Date: Nov. 21, 2008

(87) PCT Pub. No.: WO2007/134919

PCT Pub. Date: Nov. 29, 2007

(65) Prior Publication Data

US 2009/0090261 A1 Apr. 9, 2009

(30) Foreign Application Priority Data

May 23, 2006 (DE) ......................... 10 2006 024 029
Jun. 29, 2006 (DE) ......................... 10 2006 030 057
Sep. 11, 2006 (DE) ......................... 10 2006 042 590

(51) Int. Cl.

| | |
|---|---|
| ***B41F 31/00*** | (2006.01) |
| ***A01B 29/00*** | (2006.01) |
| ***B21B 1/40*** | (2006.01) |
| ***E01C 19/23*** | (2006.01) |

(52) U.S. Cl. ................... 101/352.13; 101/350.1; 492/37

(58) Field of Classification Search ............. 101/352.13, 101/352.11, 349.1, 348, 147, 350.2, 350.1; 492/37, 30, 28

See application file for complete search history.

(56) References Cited

U.S. PATENT DOCUMENTS

| | | | | |
|---|---|---|---|---|
| 4,195,570 | A | 4/1980 | Haren | |
| 4,537,127 | A | 8/1985 | Fadner et al. | |
| 5,033,380 | A * | 7/1991 | Sonobe et al. | 101/350.1 |
| 5,099,759 | A | 3/1992 | Sonobe et al. | |
| 5,388,511 | A * | 2/1995 | Iijima | 101/148 |
| 6,647,877 | B2 * | 11/2003 | Voge | 101/349.1 |
| 7,568,426 | B2 * | 8/2009 | Koppelkamm | 101/350.2 |
| 7,703,393 | B2 * | 4/2010 | Faist | 101/216 |
| 2005/0217522 | A1 | 10/2005 | Dylla et al. | |
| 2006/0037504 | A1 | 2/2006 | Koppelkamm | |
| 2007/0113747 | A1 | 5/2007 | Heiler et al. | |
| 2007/0175345 | A1 | 8/2007 | Schafer et al. | |
| 2008/0163771 | A1 | 7/2008 | Faist | |

FOREIGN PATENT DOCUMENTS

| | | | |
|---|---|---|---|
| DE | 69 10 823 | A1 | 3/1969 |
| DE | 27 23 582 | B2 | 12/1977 |
| DE | 30 04 295 | A1 | 9/1980 |
| DE | 44 39 144 | C2 | 5/1996 |

(Continued)

*Primary Examiner* — Judy Nguyen
*Assistant Examiner* — Leo Hinze
(74) *Attorney, Agent, or Firm* — Jones, Tullar & Cooper, P.C.

(57) ABSTRACT

An inking unit of a rotary printing press includes a film roller. The film roller has a structured outer surface that has a Shore D hardness ranging between 80 and 90 and a stochastic surface. The stochastic surface is incorporated into the outer surface of the film roller by peening.

35 Claims, 8 Drawing Sheets

FOREIGN PATENT DOCUMENTS

| | | | |
|---|---|---|---|
| DE | 100 39 279 | A1 | 3/2001 |
| DE | 100 28 478 | A1 | 12/2001 |
| DE | 10 2004 004 665 | A1 | 8/2005 |
| DE | 10 2004 037 889 | A1 | 10/2005 |
| DE | 10 2004 040 150 | A1 | 2/2006 |
| EP | 0 344 332 | A1 | 12/1989 |
| EP | 1 579 988 | A1 | 9/2005 |
| GB | 729 561 | | 5/1955 |
| GB | 2 044 398 | A | 10/1980 |
| JP | 2005-271407 | A | 10/2005 |
| WO | WO 2004/024451 | A1 | 3/2004 |
| WO | WO 2007/077053 | A1 | 7/2007 |

* cited by examiner

INKING UNIT OF A ROTARY PRESS, COMPRISING A FILM ROLLER

CROSS-REFERENCE TO RELATED APPLICATIONS

This application is the U.S. National phase, under 35 U.S.C. 371, of PCT/EP2007/053701, filed Apr. 17, 2007; published as WO 2007/134919 on Nov. 29, 2007 and claiming priority to DE 10 2006 024 029.4, filed May 23, 2006; to DE 10 2006 030 057.2, filed Jun. 29, 2006 and to DE 2006 042 590.1, filed Sep. 11, 2006, the disclosures of which are expressly incorporated herein by reference.

FIELD OF THE INVENTION

The present invention is directed to an inking unit of a rotary printing press comprising a film roller. The film roller has a structured circumferential surface that has a hardness of at least 60 Shore D. The surface has a stochastic structure which is imparted to the surface using shot peening.

BACKGROUND OF THE INVENTION

An inking unit of a rotary printing press comprising a film roller is known from JP 2005 271407A. The film roller has a circumferential surface with a coating of an 11-polyamide/12-polyamide or of copper.

An inking roller of a printing press having a stochastic structure formed on its circumferential surface is known from GB 729561A1. The stochastic structure is produce via shot peening.

An inking unit of a rotary printing press is known from DE 44 39 144 C2. It comprises an ink fountain roller which picks up ink from an ink reservoir, and a plurality of ink forme rollers which apply ink to a printing couple cylinder. An ink dividing roller is provided, which divides an ink flow coming from the ink fountain roller into a primary flow and a secondary flow. A distribution roller, which transfers ink from the ink dividing roller to at least one of the ink forme rollers, is provided in the primary flow and in the secondary flow. The roller train between the ink fountain roller and the ink dividing roller comprises four rollers arranged in a row, and is therefore relatively long. When the ink forme rollers are to apply a very specific quantity of ink to the printing couple cylinder, a relatively thick layer of ink is applied to the roller which is situated downstream from the ink fountain roller in the roller train. Following each gap position between two adjacent rollers in the roller train which transfer ink, the layer of ink is thinner on the roller situated downstream from the gap position. However, the respective ink layer is necessarily relatively thick, at least on the first of the four rollers situated near the ink reservoir, due to the many gap positions between that at least first roller and the printing couple cylinder. This results in increased ink misting in the case of a high-speed rotary printing press.

An inking unit of a rotary printing press is known from WO 2004/024451 A1. It is comprised of an ink fountain roller, which picks up ink from an ink reservoir, and a plurality of ink forme rollers which apply ink to a printing couple cylinder. An ink dividing roller, which divides an ink flow coming from the ink fountain roller into a primary flow and a secondary flow, is provided. A distribution roller, which transfers ink from the ink dividing roller to at least one of the ink forme rollers, is also provided in the primary flow and in the secondary flow. The ink, which is to be fed into the roller train, is applied directly to the ink dividing roller by an ink chamber blade. In this prior device, the ink dividing roller is configured as an anilox roller. A short ink train of this type has no provision for metering ink quantity by zones. It is suitable for use only in connection with a dry offset printing process which does not employ dampening agent.

A method is known from DE 10 2004 004 665 A1 in which each of the rollers of an inking unit and/or a dampening unit is equipped with a device for executing a remotely actuable radial movement of the respective roller. This can be done, for example, to adjust the roller's contact pressure against an adjacent rotational body.

A device, for use in mounting a cylinder of a printing unit using a bearing block, and which is capable of moving in linear bearings along an adjustment path and which has a rotary bearing, is known from DE 10 2004 037 889 A1. The bearing assembly is embodied as a bearing unit in the manner of a structural assembly which can be mounted as a complete unit, which, in addition to the rotary bearing, comprises both cooperating bearing elements which enable the relative movement of the bearing block.

An inking roller with a jacket piece configured as a sleeve made of a microporous elastomeric material is known from DE 27 23 582 B. In the jacket piece, which is made, for example, of foam rubber, a plurality of cavities are formed. The cavities are of substantially different sizes within a predetermined size range. The purpose of this inking roller is to prevent ink mist from being thrown off of the inking roller, especially at higher circumferential speeds of the inking roller of at least 305 m/min.

A fluid roller with a hard surface is known from DE 30 04 295 A1. A hard metal coating, such as, for example, chromium, for example having a thickness of up to 0.5 mm, is applied to the outer surface of the cylindrical core. In this coating, a random pattern of interconnected gaps, with separate islands lying between them, is created via etching. The interconnected gaps occupy up to 30% of the surface of the fluid roller. The gaps have a depth, for example, of up to 0.075 mm. This fluid roller cooperates with another roller to transport the fluid. The additional roller has a soft circumferential surface. These two rollers are engaged against one another.

An inking roller, which is made of steel, is known from U.S. Pat. No. 4,537,127A. The circumferential surface of this inking roller is preferably structured with intersecting lines in a cell pattern via engraving, is boundary hardened in a nitration process, and is then subjected to an oxidation process. The oxidation process forms an outer layer, comprised primarily of $Fe_3O_4$, on the circumferential surface of the roller.

A printing unit, with an inking unit having at least one ink dividing roller, is known from DE 10 2004 040 150 A1. Only a single roller is positioned in the inking unit between an ink fountain roller, which picks up ink from an ink reservoir, and the ink dividing roller. This single roller is configured as a film roller. The film roller has a structured circumferential surface.

A film roller for inking units of rotary printing presses is known from DE 69 10 823 U. The surface of that film roller is equipped with a thin layer of hard rubber. The hard rubber layer has a Shore hardness of 80 to 85°.

A method of producing an anilox roller, made preferably of steel, is known from DE 100 28 478 A1. This anilox roller is equipped, on its outer surface, with small depressions. The depressions are preferably generated via shot peening. A limitation of this prior anilox roller is that a circumferential surface made of steel will create a discontinuity in ink transport after only a short period of operation, especially when used in a wet offset printing process. This is because such a circumferential surface tends to run out of ink rapidly.

SUMMARY OF THE INVENTION

The object of the present invention is to provide an inking unit of a rotary printing press comprising a film roller. The inking unit in accordance with the present invention is wear resistant at a transport speed of a print substrate printed in this rotary printing press of more than 10 m/s. It also tends less toward ink misting, and can be used to produce a high quality printed product.

The object of the present invention is attained, according to the present invention with the provision of a film roller with a structured circumferential surface having a hardness of at least 60 Shore D. This structured surface has a stochastic structure which in imparted via shot peening. The circumferential surface has irregularly distributed depressions ranging in depth from 50 μm to 400 μm. The open depressions on the circumferential surface of the film roller make up a maximum vacant space ratio of 35%, relative to a closed, cylindrical surface of the film roller.

The benefits to be achieved with the present invention consist especially in that a film roller having a circumferential surface with a hardness of at least 60 Shore D, and preferably with a surface hardness of more than 70 Shore D, and especially within the hardness range of 80 to 90 Shore D, is more wear resistant than a traditional film roller, such as, for example, a film roller having an outer surface with a hard rubber layer, under the conditions of use that are present in a high-speed rotary printing press which is operating at a transport speed of more than 10 m/s of the print substrate to be printed. This increased wear resistance is because the desirable high values for the hardness of the circumferential surface of such a film roller cannot be achieved using rubber materials. To provide a circumferential surface that will be wear resistant under the above-described operating conditions, it is advantageous to select a polyamide or a polyacrylate or copper as the material for the circumferential surface of the film roller. These materials are characterized by a high resistance to wear and by resistance to aging, while also possessing very beneficial ink absorption and ink delivery properties due to their ink affinity. Particularly advantageous, in accordance with the present invention, is the use of Rilsan®, which is a polyamide made of 11-aminoundecanoic acid (Rilsan B, PA 11) or of ω-laurolactam (Rilsan A, PA 12). These polyamide materials have a hardness of at least 60 Shore D, and preferably have a hardness of more than 70 Shore D. Particularly high hardness values are achieved by reinforcing the relevant polyamide material with glass fibers. It is significant that in an inking unit there is a very great difference between the respective circumferential speeds of the ink fountain roller and of the ink dividing roller. The circumferential surface of the film roller, which is situated between the ink fountain roller and the ink dividing roller, is subjected to a high mechanical stress and, if applicable, is also subjected to a high thermal stress.

It is advantageous, in accordance with the present invention, to configure the circumferential surface of a film roller with a stochastic structure. This is because a film roller having such a circumferential surface with a stochastic structure has a very favorable ink transport capability, which ink transport capability contributes to the production of a high quality printed product. Moreover, the method of imparting the stochastic structure to the circumferential surface of the film roller, in accordance with the present invention, is highly advantageous. This is because shot peening is a very cost-effective processing method.

It is further advantageous, in accordance with the present invention, that, due to the shortness of the roller train which transports ink to the printing couple cylinder, and thus, due to the low number of ink gap positions, the ink fountain roller needs to pick up only a comparatively thin layer of ink from the ink reservoir and to apply it to the roller that is situated downstream from the ink fountain roller in order to provide the requisite quantity of ink to the printing couple cylinder. Consequently, the ink layers on the rollers, which ink layers are the main causes of ink misting, which is especially true on the film roller, are relatively thin. Therefore, the inking unit in accordance with the present invention tends toward less ink misting, even when it is used in a high-speed rotary printing press in which the substrate being printed is transported at a speed of more than 10 m/s.

The combination of features of the present invention accordingly results in a film roller which, under the operating conditions imposed on it in a high-speed rotary printing press, has a long service life and also has a highly beneficial ink transport capability, together with a low level of ink misting. The film roller of the present invention is also cost-effective to produce.

A further advantage of the inking unit, with the ink film roller of the present invention, consists in that, because of the short roller train, the inking unit reacts rapidly to ink metering adjustments made, for example, to one or more ink zones during an ongoing production run. Such a rapid reactions result in the reduction of the amount of waste paper that is produced before the new ink quantity has become stabilized.

Added to this is the advantage that the inking unit, in accordance with the present invention, holds only a relatively low volume of ink in its relatively short roller train. This low ink volume allows the washing times, which are associated with a cleaning of the inking unit, to also be kept short. Short washing times help meet the demand for short set-up times. This is especially important among customers involved in newspaper printing, because the washing times are included in the setup times.

A front-loaded inking unit with a plurality of ink forme rollers, such as, for example, with at least three ink forme rollers, as is provided by the present invention, generates an even ink application on the printing couple cylinder against which the ink forme rollers are engaged, or on the at least one printing forme which is arranged on this printing couple cylinder. This is a fundamental criterion for the quality of the printed product which is to be produced in the printing press that comprises the inking unit in accordance with the present invention. Classic newspaper printing presses have usually had only two ink forme rollers. However, three ink forme rollers even out the ink application better than can be accomplished through the provision of only two ink forme rollers. There ink forme rollers are also better at evening out a pattern that forms on the ink forme rollers with respect to their respective ink film. The result is that an inking unit having three or more ink forme rollers tends less toward ghosting.

Ghosting refers to the presence of a shadow-like, repeating, undesirable imaging of a part of a print image, which is formed in the printing direction of the printing couple cylinder. The imaging is characterized by the presence of a greater or lesser inking, as compared with the surrounding area. Ghosting is affected by the distribution of ink in the inking unit, and is especially affected by the distribution of ink on the ink forme rollers. If a previously impressed ink profile is not adequately broken down, or is not evened out, through ink resplitting, based upon the image on the printing forme before the next inking up, or before the next rotation of the ink forme roller, then the image segment that already been printed will be partially transferred to, or ghosted onto another image segment to be printed on the substrate.

In addition, and in accordance with the present invention, by mounting at least the film roller and/or the ink dividing roller and/or the ink forme rollers of the inking unit so as to allow radial movement, an improvement in the quality of the printed product produced in connection with this inking unit is possible. This quality improvement is because the contact pressure that is exerted by the respective roller can be adjusted and can be corrected as needed. With this adjustment, the transport of ink can be controlled and thereby can be optimized.

BRIEF DESCRIPTION OF THE DRAWINGS

One preferred embodiment of the present invention is represented in the set of drawings and will be specified in greater detail in what follows.

The drawings show.

DESCRIPTION OF THE PREFERRED EMBODIMENT

Figure 1:
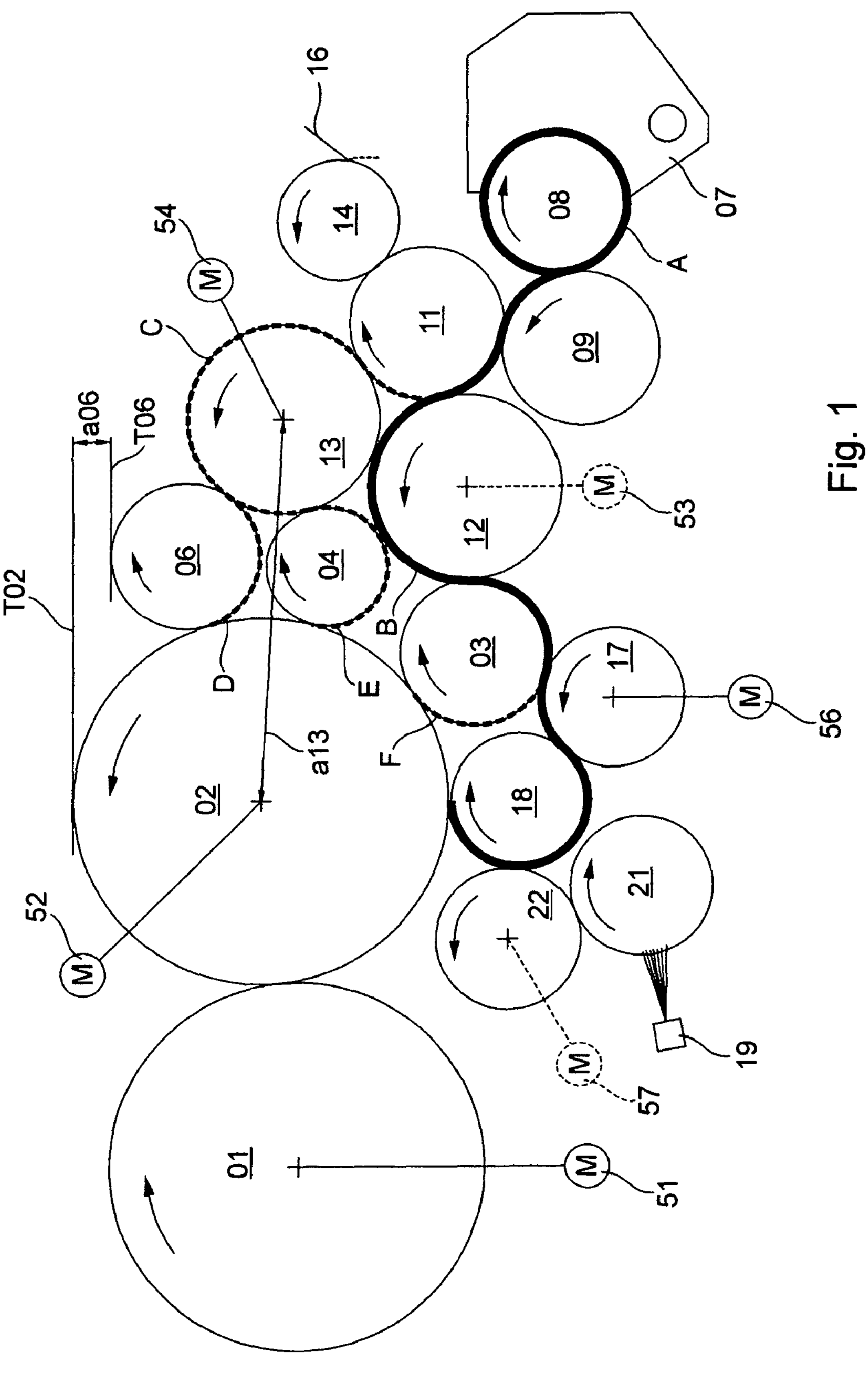
FIG. 1 a schematic side elevation view of a part of a printing couple with an inking unit and with a dampening unit.

Referring initially to FIG. 1, a part of a printing couple of a rotary printing press is shown by way of example. In the represented example of FIG. 1, the rotary printing press operates using a wet offset printing process. Such a printing press is intended especially for use in newspaper printing. As printing couple cylinders 01; 02, the printing couple depicted in FIG. 1 has at least one transfer cylinder 01 and at least one forme cylinder 02 which cooperates with the associated transfer cylinder 01. Each time it rotates, the transfer cylinder 01 produces at least one printed image on a print substrate, preferably on a material web, especially on a paper web, which is not specifically shown here. When the printing couple is in the operating position that is shown in FIG. 1, at least one inking unit and one dampening unit are engaged against the forme cylinder 02.

The inking unit which is shown in FIG. 1 has a plurality of ink forme rollers, preferably at least three, 03; 04; 06, which are engaged against the forme cylinder 02 when the rotary printing press is in a production run. A plurality of rollers 09; 11; 12; 13 are situated between an ink fountain roller 08, which picks up ink from an ink reservoir 07, and the ink forme rollers 03; 04; 06, which apply the ink to the forme cylinder 02. The roller 09 which follows closest behind the ink fountain roller 08 in the direction of ink transport, and which directly engages the ink fountain roller 08 is configured as an ink film roller 09. In the direction of ink transport, a roller 11, which is configured as an ink dividing roller 11, is then provided downstream from the ink film roller 09, and divides an ink flow A coming from the ink fountain roller 08 into a primary ink flow B and a secondary ink flow C. In FIG. 1, the path of the primary ink flow B, which leads to the forme cylinder 02, is indicated by a solid line, and the path of the secondary ink flow C, which also leads to the forme cylinder 02, is indicated by a dashed line. A roller 12; 13, which transfers ink from the ink dividing roller 11 to at least one of the ink forme rollers 03; 04; 06, is situated in the primary ink flow B and a similar roller 12; 13 is also situated in the secondary ink flow C, respectively. Each of these rollers 12; 13 is configured as a distribution roller 12; 13. Each of the two distribution rollers 12; 13 executes an oscillating movement in its respective axial direction. An oscillating movement of the one distribution roller 12 can be coupled to the oscillating movement of the other distribution roller 13, for example by the use of a suitable lever assembly. In an alternative embodiment, the oscillating movement of each of the respective distribution rollers 12; 13 are generated by drives which are independent of one another. With both drive variants, the two oscillating movements can be directed opposite to one another. The oscillating movement of the respective distribution roller 12; 13 can be generated from its rotational movement, for example, by a transmission. In both the primary flow B and the secondary flow C, ink, which has been picked up from the ink reservoir 07, is applied to the forme cylinder 02 via a roller train having five rollers 08; 09; 11; 12; 13; 03; 04; 06 arranged in a row. The ink fountain roller 08, the ink film roller 09, the ink dividing roller 11, one of the ink distribution rollers 12; 13 and one of the ink forme rollers 03; 04; 06 are components of each roller train which leads to the respective forme cylinder 02. Accordingly, only a single ink film roller 09 is arranged in the roller train between the ink fountain roller 08 and the ink dividing roller 11. This ink film roller 09 has a special characteristic, with respect to its circumferential surface, which special characteristic will be addressed at a later point in this disclosure.

Primary ink flow B is the part of the ink flow A, that is coming from the ink fountain roller 08, which is picked up by the ink dividing roller 11, which is directed in the direction of rotation of that ink dividing roller 11 and which is forwarded as the first ink flow in the direction of the forme cylinder 02 via the distribution roller 12 that is situated in this primary flow B. The part of the ink flow A, which is coming from the ink fountain roller 08, and which is picked up by the ink dividing roller 11, in the direction of rotation of that ink dividing roller 11, downstream from the primary flow B and which is forwarded in the direction of the forme cylinder 02, is referred to as the secondary flow C of the ink which is picked up from the ink reservoir 07. The secondary flow C can, in turn, be divided into additional partial ink flows D; E, if a plurality, and especially if two, of the ink forme rollers 03; 04; 06 are engaged against the distribution roller 13, which is positioned in the secondary flow C. Because the primary flow B of the ink flow A coming from the ink fountain roller 08 is the first to reach the forme cylinder 02, in the direction of rotation of the forme cylinder 02, and is at least spatially in front of the secondary ink flow C and its partial ink flows D; E, this type of inking unit depicted in FIG. 1 is referred to as a front-loaded inking unit. The ink which is transported in the secondary flow C of the ink flow A coming from the ink fountain roller 08 is applied, for example, to the forme cylinder 02, which has already been inked by the primary flow B. The ink forme rollers 04; 06 which belong to the secondary flow C and to its partial flows D; E also smooth out the portion of the ink which has previously been applied to the forme cylinder 02 in the primary flow B. Such an inking unit generates an even application of ink on the forme cylinder 02 to be inked. An inking unit whose primary flow B of the ink flow A which is coming from the ink fountain roller 08 and which is applied to the forme cylinder 02 in its direction of rotation, only after the secondary flow C and its partial flows D; E are applied to the forme cylinder 02, is referred to as a rear-loaded inking unit.

The ink reservoir 07, from which the ink fountain roller 08 picks up the ink which is to be transported to the forme cylinder 02, is embodied, for example, as an ink fountain 07 or as an ink trough 07. A plurality of ink blades, which are not specifically shown, such as, for example, thirty to sixty ink blades, are provided in a row on the ink fountain 07 or on the ink trough 07 in the axial direction of the ink fountain roller 08. Each of these ink blades can be adjusted, in terms of its respective engagement against the ink fountain roller 08, and is actually engaged against that ink fountain roller, preferably remotely, via an adjustment mechanism, which is not specifically shown, thereby allowing a zonal metering of the ink which is picked up by the ink fountain roller 08 from the ink reservoir 07. The metering of the quantity of ink, which is performed by adjusting the respective ink blade, is expressed in an ink film thickness, which ink film thickness is proportional to this adjustment in the relevant zone on the circumferential surface of the ink fountain roller 08. Accordingly, in the preferred embodiment of the present invention, the inking unit is structured as a zonal inking unit.

The lengths of the rollers 03; 04; 06; 08; 09; 11; 12; 13 of the inking unit, in their respective axial directions range, for example, from 500 mm to 2,600 mm, and especially range from 1,400 mm to 2,400 mm. Their outer diameters range, for example, from 50 mm to 300 mm, and preferably range from 80 mm to 250 mm.

The circumferential surface of the ink dividing roller 11 is preferably made of a flexible material, such as, for example, a rubber material. The layer thickness of the elastomeric material on the circumferential surface of the ink dividing roller 11 can range, for example, from 1 mm to 20 mm, and preferably can range from 5 mm to 15 mm. The circumferential surface of the ink dividing roller 11 is preferably structured with a hardness ranging from 40 to 80 Shore A, and especially with a hardness ranging from 50 to 60 Shore A, with this measurement of hardness being defined according to DIN 53505. The higher the value of this hardness indicator, the greater the hardness of the material, which, in this case, is used for the circumferential surface of the ink dividing roller 11.

As a special characteristic of its circumferential surface, the ink film roller 09 has a circumferential surface with a stochastic structure, or in other words, is configured with a circumferential surface with an irregular distribution of elements which structure this circumferential surface, and which irregular distribution of elements generally have an irregular form and further have no specific preferred direction or orientation. The circumferential surface of the ink film roller 09 is preferably such as made of a plastic, preferably a polyacrylate or polyamide, and especially is name of Rilsan® or, in an alternative embodiment, is made of copper. The circumferential surface of the film roller 09 is relatively hard in structure, having a hardness of at least 60 Shore D, and preferably having a hardness of more than 70 Shore D, and especially having a hardness ranging from 80 to 90 Shore D, with this measurement of hardness also being defined according to DIN 53505. In the preferred embodiment of the ink film roller 09, the stochastic structure is produced on an initially smooth and homogeneous circumferential surface of the ink film roller 09 using a shot peening procedure, which shot peening procedure represents a particularly simple and therefore a cost-effective production procedure of the circumferential surface of this ink film roller 09, which is advantageous for the transport of ink. It is important to note that there is no linear correlation between the hardness testing processes in accordance with Shore A and Shore D. For purely informational purposes, an addendum to DIN 53505 states that a hardness of 80 Shore A corresponds to a hardness of approximately 30 Shore D. A hardness measurement of at least 60 Shore D, preferably of more than 70 Shore D, and especially of 80 to 90 Shore D is therefore characteristic of a relatively very hard surface.

The circumferential surface of each of the distribution rollers 12; 13 can also be made of plastic, preferably a polyamide, and especially Rilsan®. The circumferential surface of each of the distribution rollers 12; 13 is smooth and has no stochastic structure. Each of the ink forme rollers 03; 04; 06 preferably has a circumferential surface which is also made of an elastomeric material, preferably a rubber, with the hardness of these circumferential surfaces, as defined according to DIN 53505, preferably ranging from 35 to 60 Shore A. The circumferential surface of the ink fountain roller 08, which is preferably dipped into ink in the ink reservoir 07, can be steel or can be a ceramic layer which is applied to a material that forms the core of the ink fountain roller 08.

The stochastic structure of the circumferential surface of the ink film roller 09 is preferably embodied by cavities and depressions that have been imparted to this circumferential surface by the shot peening procedure discussed above, which form the structural elements. Depths of the cavities and depressions, measured in the radial direction of the ink film roller 09, can range, for example, from 50 μm to 400 μm. This depth is non-uniform with respect to the structural elements which are distributed over the circumferential surface of the film roller 09. The roughness of the cylindrical surface which actually delimits the ink film roller 09 as a rotational body has an absolute roughness depth Rt ranging, for example, from 100 μm to 120 μm and a mean roughness depth $R_z$ ranging, for example, from 60 μm to 80 μm. These values can be determined, for example, using a perthometer, which is typically a tracing stylus instrument, preferably operating according to pertinent standards, such as, for example, DIN EN ISO 4287. A smallest material ratio Mr1 of the circumferential surface of the film roller 09, corresponding to a percentage of contact area of the peaks, and determined according to DIN 4776 from an Abbott curve, ranges, for example, from 7% to 13%, and preferably ranges from 9% to 11%. A greatest material ratio Mr2 of the circumferential surface of the film roller 09, corresponding to a percentage of contact area of the ridging, as determined according to DIN 4776 using the same Abbott curve, ranges, for example, from 80% to 95%, and preferably ranges from 85% to 90%.

Each of the open cavities and/or the depressions, which are formed on the circumferential surface of the ink film roller 09, forms a vacant space with respect to the cylindrical datum surface, or in other words, with respect to the closed and smooth-walled assumed cylindrical surface of the ink film roller 09. That vacant space corresponds to the cross-section of the opening of the respective cavity or of the respective depression in the plane of the datum surface. The total vacant space of all of the cavities and/or all of the depressions on the circumferential surface of the film roller 09 forms a vacant space ratio relative to the closed, assumed cylindrical surface, with the maximum vacant space ratio amounting to 35% of this cylindrical surface and with that vacant space ratio preferably lying between 20% and 30%. Depending upon the sizes of their respective vacant spaces and their respective depths, the cavities and/or depressions of the film roller 09 form a vacant volume. The vacant volume of all of the cavities and/or all of the depressions existing per $m^2$ of assumed cylindrical surface amounts to at least 50,000 $mm^3$, preferably amounts to at least 100,000 $mm^3$, especially amounts to at least 150,000 $mm^3$.

The cavities and/or the depressions which are arranged on the circumferential surface of the ink film roller 09 therefore structure the circumferential surface of the ink film roller 09 with their respective vacant space ratio and their respective vacant volume, forming a relief. This relief can be adapted, for example, to the rheological behavior of the ink to be transported, and can be adapted especially to the viscosity and/or to the smoothness of the ink to be transported. The processes of filling and emptying the cavities and/or depressions with the ink to be transported, and an adherence of the ink to be transported, during its respective transport from the ink fountain roller 08 to the ink dividing roller 11, are optimized based upon a rotational speed which is provided for this ink film roller 09 on its circumferential surface. A transport speed of the substrate which is being printed in this rotary printing press, which transport speed conditions the rotational speed of the film roller 09, can range, for example, up to 20 m/s when such a rotary printing press of this type is being used especially in newspaper printing. The beneficial effect of the cavities and/or depressions which have been introduced into the ink film roller 09, comes to bear especially at a higher transport speed of the print substrate which is printed in the rotary printing press, for example at a transport speed of at least 10 m/s, and especially within the transport speed range of between 10 m/s and 15 m/s. The production speed of the printing press can also be indicated by the speed of its printing couple cylinders 01; 02. This speed of the rotating printing couple cylinders 01; 02, which are embodied, for example, as double-circumference cylinders, amounts, for example, to more than 40,000 revolutions per hour. A double-circumference cylinder has two longitudinal sections, which are each preferably equal in length, along its circumference, with each one of the two longitudinal sections corresponding, for example, to the height of one newspaper page to be printed. The two cooperating printing couple cylinders 01; 02 are preferably equal in circumference.

To even out the thickness of the layer of ink on the ink dividing roller 11, and to remove excess ink which is applied by the ink fountain roller 08 to the circumferential surface of that ink dividing roller 11, another roller 14, which may be embodied as a doctor roller 14, can be engaged or at least can be engageable against the ink dividing roller 11. A doctor blade 16 is positioned on the doctor roller 14. The doctor roller 14 is engaged against the ink dividing roller 11 downstream, in the direction of rotation of the ink dividing roller 11, from the point at which the secondary flow C branches off. The excess ink which is doctored off the ink dividing roller 11 by the doctor roller 14, with the use of the doctor blade 16, is returned, for example, to the ink reservoir 07, which is indicated schematically in FIG. 1 by the depiction of ink dripping from the doctor roller 14 below the doctor blade 16 in the direction of rotation of the roller.

Additionally, a stripper roller 17 can be provided. The stripper roller 17 is engaged, or at least can be engaged simultaneously against one of the ink forme rollers 03 and against a roller 18 of a dampening unit that can be also engaged against the forme cylinder 02. The roller 18 of the dampening unit can be embodied, for example, as a dampening forme roller 18. The stripper roller 17 can preferably be engaged against the ink forme roller 03, which is situated in the primary flow B. Stripper roller 17 again smoothes the primary flow B of the ink flow A coming from the ink fountain roller 08 and leading to the forme cylinder 02. The dampening unit is preferably embodied as a dampening unit that applies a dampening agent which is received in the dampening unit in a contactless fashion, for example as a spray dampening unit. The dampening unit has a spray bar 19. A plurality of spray nozzles, which are arranged on the spray bar 19, spray the dampening agent onto a roller 21 of the dampening unit, which roller 21 is embodied, for example, as a dampening distribution roller 21. The dampening agent that is sprayed onto the dampening distribution roller 21 by the spray bar 19 is transferred by a further roller 22 of the dampening unit, which further roller 22 may be embodied, for example, as a smoothing roller 22, to its dampening forme roller 18. From there, the dampening agent is transferred to the forme cylinder 02. With the use of the stripper roller 17, the primary flow B of the ink flow A, which is coming from the ink fountain roller 08 and leading to the forme cylinder 02, can be extended up to the dampening forme roller 18 of the dampening unit. This configuration provides the advantage that the ink being transported in the primary flow B comes into contact with the dampening agent supplied by this dampening unit, in the dampening unit, and is applied to the forme cylinder 02 together with the dampening agent. In this operational case, only a partial flow F of the ink transported in the primary flow B now leads from the ink forme roller 03, which is situated in the primary flow B, directly to the forme cylinder 02. The majority of the ink in the primary flow B is applied to the forme cylinder 02 through the stripping roller 17 and the dampening forme roller 18.

The circumferential surface of the dampening forme roller 18 is preferably made of an elastomeric material, preferably a rubber. The hardness of this circumferential surface, defined according to DIN 53505, preferably ranges from 25 to 30 Shore A, and is therefore relatively soft. Assuming that the circumferential surface of a cooperating smoothing roller 22 is made of chromium, the circumferential surface of the dampening distribution roller 21 is also made of a relatively soft elastomeric material, preferably a rubber. The hardness of this circumferential surface, defined according to DIN 53505, preferably ranges from 25 to 30 Shore A. If, however, the circumferential surface of the smoothing roller 22 is also made of an elastomeric material, then the circumferential surface of the smoothing roller 22 and that of the dampening distribution roller 21 are preferably made of the same elastomeric material, for example a rubber. The hardness of each of these circumferential surfaces, defined according to DIN 53505, preferably ranges from 40 to 60 Shore A. Therefore, the circumferential surface of the dampening distribution roller 21, in the second alternative, in which the smoothing roller 22 has an elastomeric surface, is harder than that of the first alternative in which the smoothing roller 22 has a chromium surface. Whether the first or the second alternative is used depends upon how the rollers 18; 21; 22 of the dampening unit are driven. If the smoothing roller 22 has an independent drive 57, such as, for example, an electric motor 57, which is schematically represented in FIG. 1 by a dashed line due to its optional use, then the circumferential surface of roller 22 is made of chromium and the circumferential surface of the dampening distribution roller 21, that cooperates with this driven smoothing roller 22, is embodied as being relatively soft, as described above. If the rollers 18; 21; 22 of the dampening unit are all driven via friction, or in other words, if the dampening unit does not have a separate drive 57, the aforementioned second alternative is the preferred embodiment. In the case of the frictionally driven dampening unit, the stripper roller 17 can have an independent drive 56, such as, for example, an electric motor 56. The rotating stripper roller 17 now exerts a torque force on the dampening forme roller 18 that cooperates with it, which torque force exerted on dampening forme roller 18, in turn, drives the smoothing roller 22 via friction. This rotation of smoothing roller 22 then ultimately drives the dampening distribution roller 21. The smoothing roller 22 is preferably configured as being capable of oscillating axially. The oscillating movement, which extends in the axial direction of this smoothing roller 22, can be generated via an independent drive. Alternatively, the oscillating movement of the smoothing roller 22 is coupled with the drive which produces the rotational movement of this smoothing roller 22. The oscillating movement of the smoothing roller 22 is thereby derived from the rotational movement of smoothing roller 22 by the provision of a transmission.

In FIG. 1, the direction of rotation of each of the respective rollers 03; 04; 06; 08; 09; 11; 12; 13; 14 of the inking unit, that of the stripper roller 17, that of the rollers 18; 21; 22 of the dampening unit, and that of each of the printing couple cylinders 01; 02 is indicated in each case by an assigned arrow. Each of the printing couple cylinders 01; 02 is respectively connected to a drive 51; 52, such as, for example, an electric motor 51; 52. These cylinder drives 51; 52 are controlled or are regulated individually and separately from one another. In the inking unit, only one of the distribution rollers 12; 13, namely either the distribution roller 12 or the distribution roller 13, is driven by a drive 53; 54, such as, for example, an electric motor 53; 54. In FIG. 1, the preferred embodiment of the present invention is represented, in which the distribution roller 12 is driven and the distribution roller 13 has no motor. The other alternative is represented by a drive 53 for the distribution roller 13, which is indicated only by dashed lines since it is an alternate embodiment. The remaining rollers 03; 04; 06; 08; 09; 11; 14 of the inking unit are frictionally driven and therefore do not have their own separate motorized drives. To enable a change of the center ink forme roller 04, the upper ink distribution roller 13 can be pivoted, via the provision of a mechanical device, in a direction which increases its axial distance a13 from the forme cylinder 02. The center ink forme roller 04 can now be removed from the area between the forme cylinder 02 and the upper distribution roller 13 by a vertical upward movement.

Figure 8:
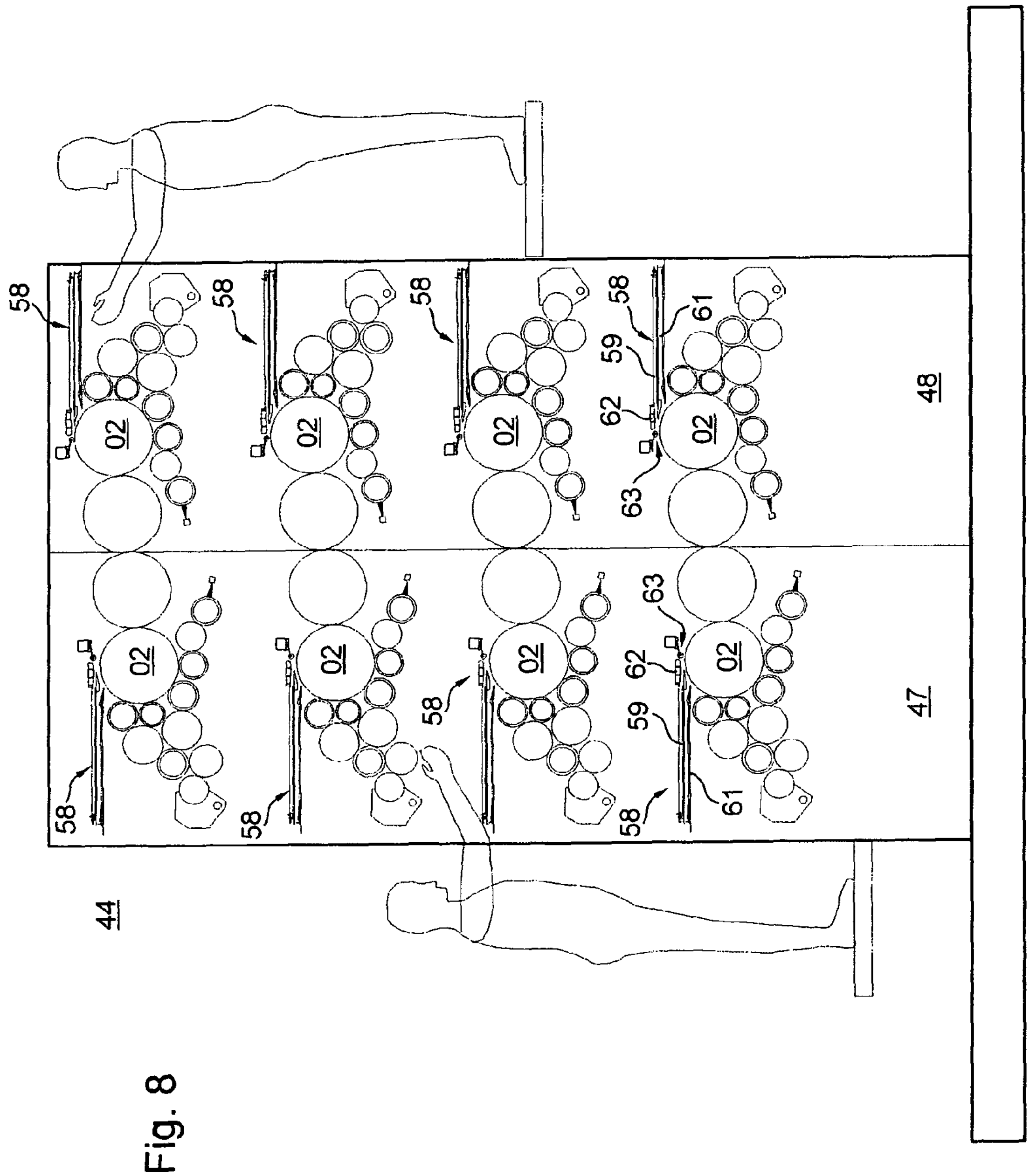
FIG. 8 the printing tower shown in FIG. 5, with a printing forme magazine engaged against the respective forme cylinders.

The uppermost ink forme roller 06 of the inking unit is situated such that, in its operating position, in which it is engaged against the forme cylinder 02, a horizontal tangent T06, which is placed on the periphery of this ink forme roller 06, is located at a vertical distance a06 of at least 50 mm from, and beneath a horizontal tangent T02 which is placed on the periphery of the forme cylinder 02. This vertical distance a06 forms an offset, so to speak, between the uppermost ink forme roller 06 and the forme cylinder 02. This arrangement allows sufficient access to the forme cylinder 02, from an operating side of the printing couple, especially if all of the remaining rollers 03; 04; 08; 09; 11; 12; 13; 14 belonging to the inking unit are positioned substantially below the horizontal tangent T06 placed on the periphery of the uppermost ink forme roller 06. The rollers 18; 21; 22 of the dampening unit are positioned substantially below the forme cylinder 02, and also do not restrict access to the forme cylinder 02. Accessibility of the forme cylinder 02 is necessary, for example, to allow one or more printing formes, which are carried on the circumferential surface of the forme cylinder 02, to be changed within the shortest possible time. A change of printing formes on the forme cylinder 02 can be performed manually by a printing press operator, or can be performed automatically with the help of a printing forme magazine 58, as may be seen in FIG. 8, and which is preferably positioned tangentially against the forme cylinder 02.

Despite the relatively low number of ink gap positions in the roller train that transports ink to the printing couple cylinder 02 in accordance with the present invention, the represented inking unit generates an even ink application on the printing couple cylinder 02. This is because more rollers are provided where they are especially needed for smoothing the applied ink, namely in direct contact with the printing couple cylinder 02, where preferably the three ink forme rollers 03; 04; 06 are provided. Particularly, with the provision of the special, stochastic structure of the circumferential surface of the film roller 09, the inking unit in accordance with the present invention is not prone to ghosting. As a result, a high quality printed product can be produced using this inking unit, even in newspaper printing, which accomplishes compliance with the ever-increasing demand for quality in newspaper printing. Even in a high-speed printing press, in which the transport speed of the print substrate exceeds 10 m/s, and preferably ranging from 10 m/s to 15 m/s, as is currently customary in newspaper printing, the undesirable effect of ink misting rarely occurs. This is a result of the use of the short roller train and the use of the film roller 09 in accordance with the present invention. The use of the inking unit described in reference to FIG. 1 in a rotary printing press, and especially in a newspaper printing press, will be described in greater detail with reference to the subsequent figures.

Figure 2:
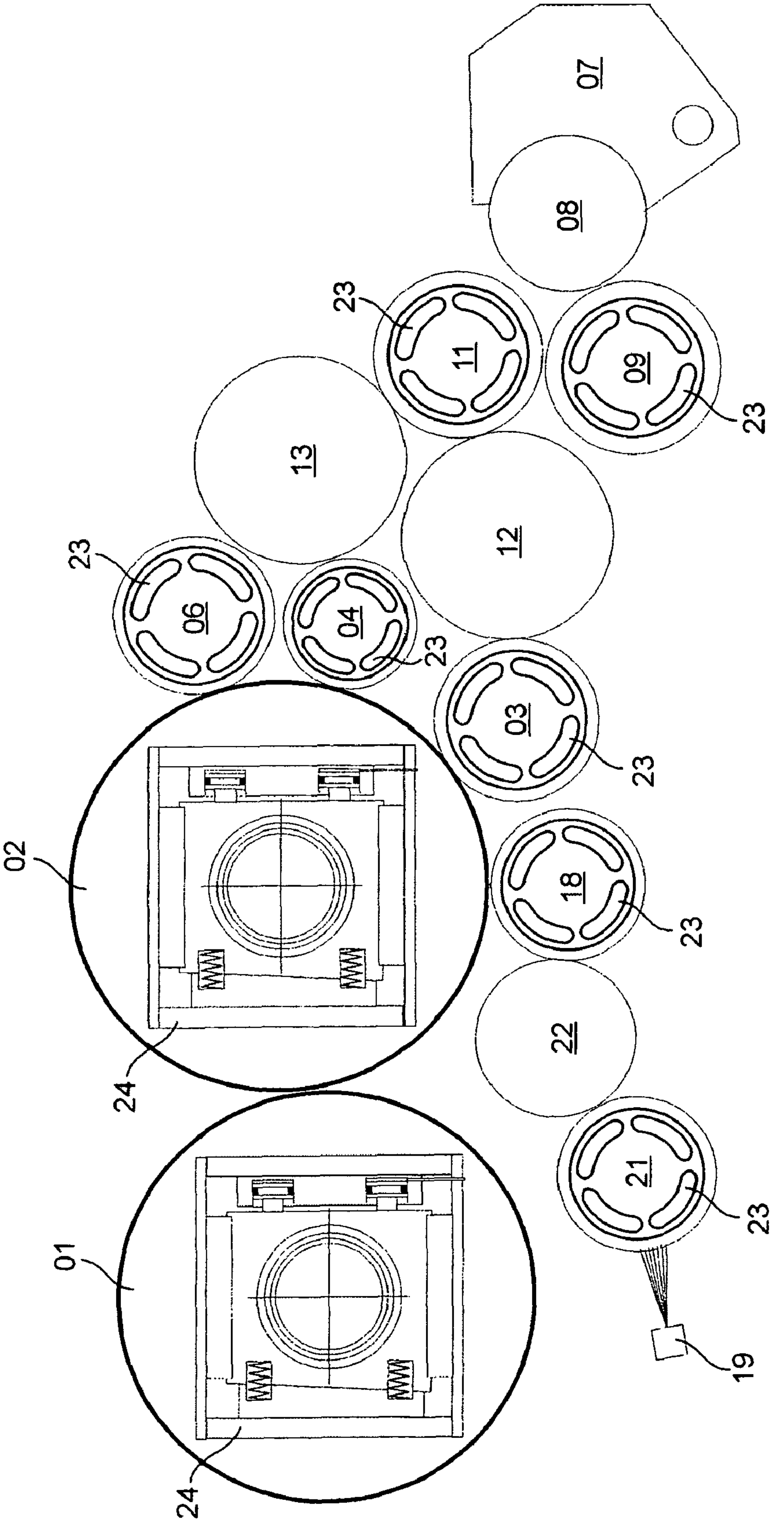
FIG. 2 a schematic view of the part of the printing couple shown in FIG. 1, with a bearing assembly for the printing couple cylinders and with various rollers, each with its own adjustment device, and in which each of the roller trains is closed.
Figure 3:
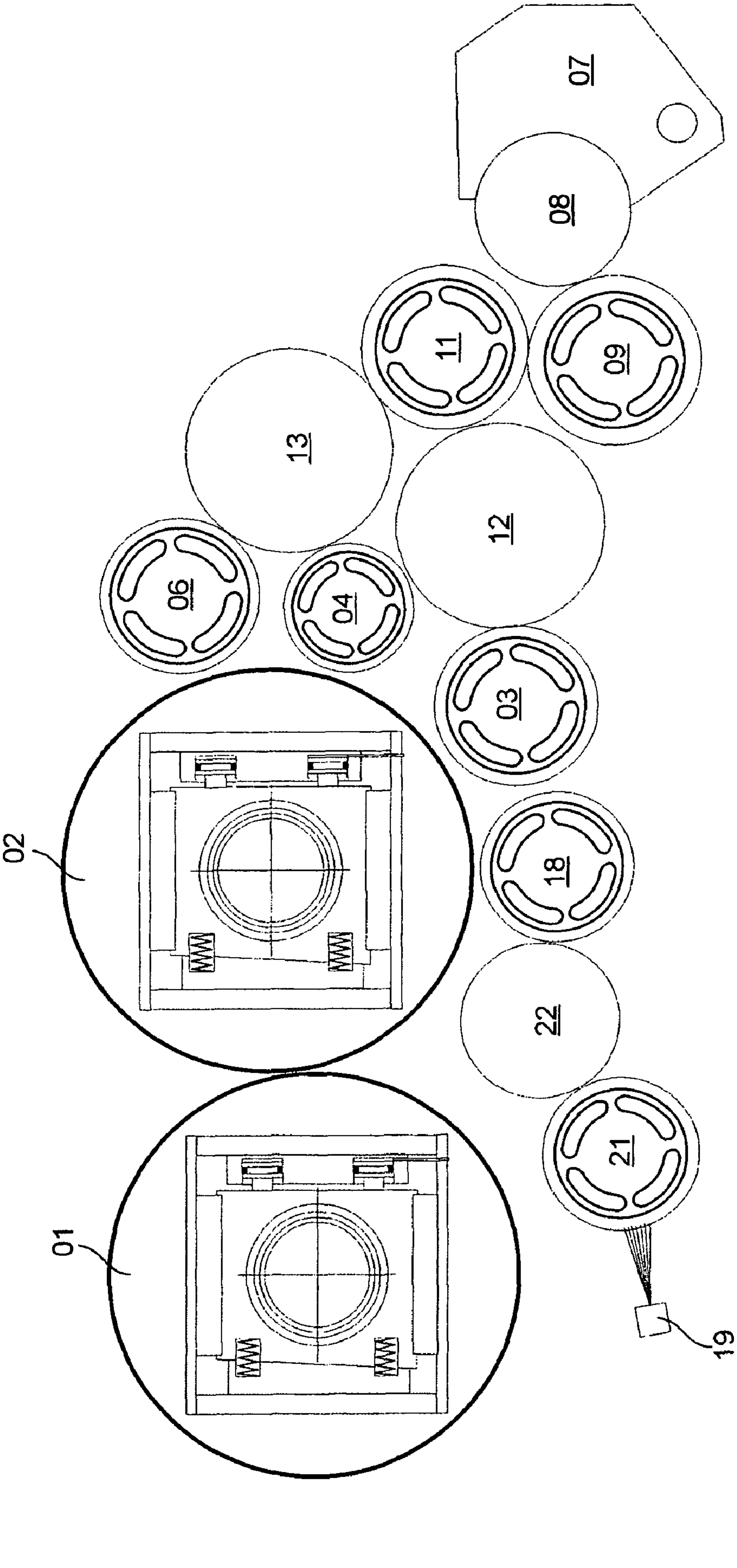
FIG. 3 the schematic view of the part of the printing couple shown in FIG. 1 with a bearing assembly for the printing couple cylinders, and with various rollers, each with its own adjustment device, and in which each of the roller trains is interrupted by a gap.

FIGS. 2 and 3 show a schematic drawing, again of the part of a printing couple which is represented in FIG. 1. In this depiction, the mounting of the printing couple cylinders 01; 02 and a respective adjustment device for the ink forme rollers 03; 04; 06, the film roller 09, the ink dividing roller 11, the dampening forme roller 18 and the dampening distribution roller 21 are particularly emphasized. In FIGS. 2 and 3, in contrast to FIG. 1, representations of the doctor roller 14 and of the stripper roller 17 have been omitted for the purpose of simplicity. The representations in FIGS. 2 and 3 differ from one another in that FIG. 2 shows a first operating position in which each of the roller trains is preferably closed. This means that, for example, the ink forme rollers 03; 04; 06 are engaged against the forme cylinder 02 and are also engaged against one of the distribution rollers 12; 13. The dampening forme roller 18 is engaged against the forme cylinder 02 and against the smoothing roller 22. FIG. 3, in contrast, shows a second operating position in which the roller trains are preferably open, or are interrupted by a gap. This means that, for example, the ink forme rollers 03; 04; 06 and/or the dampening forme roller 18 are disengaged, at least from the forme cylinder 02.

Figure 5:
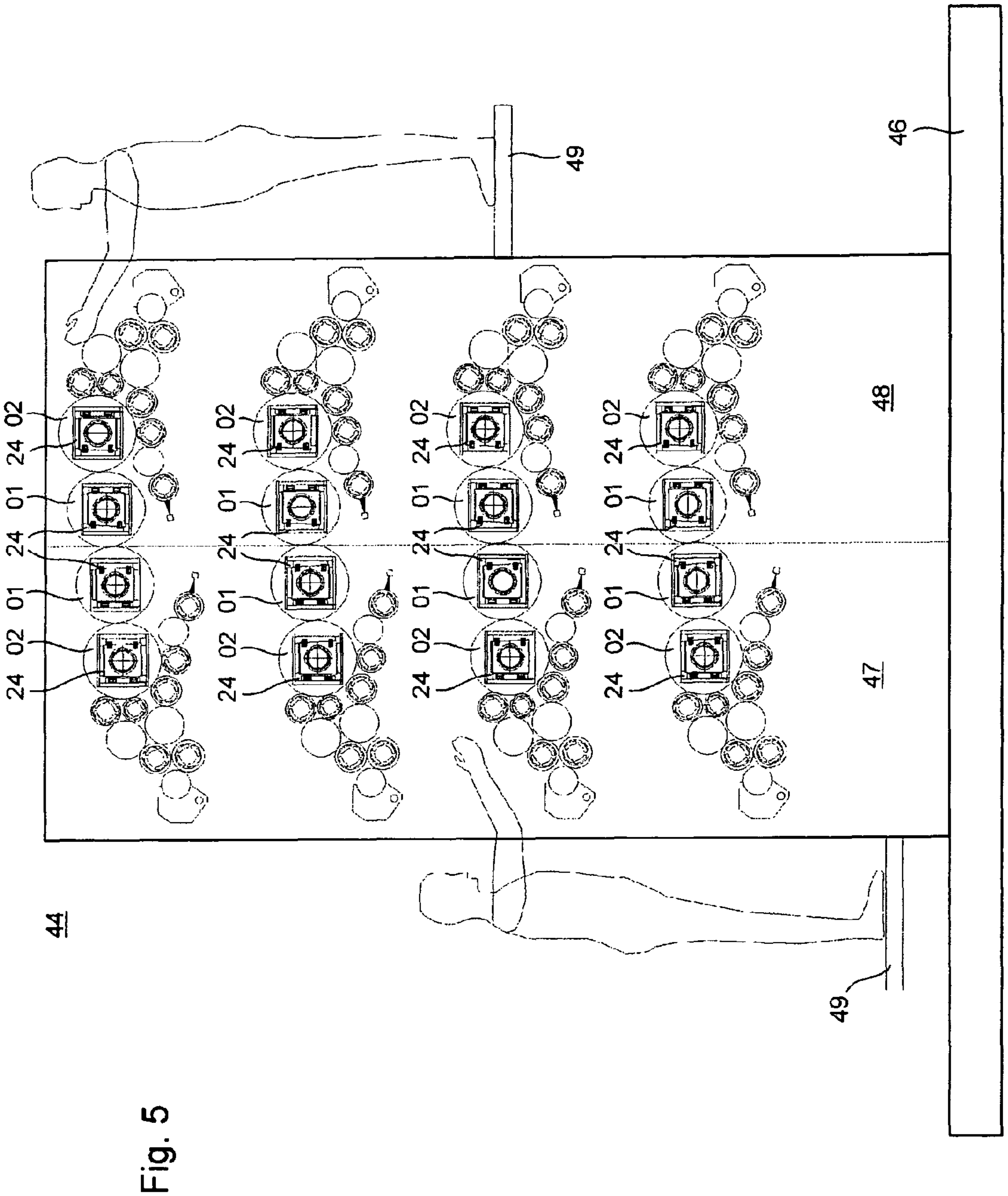
FIG. 5 a schematic side elevation view of a printing tower of a printing press, with a plurality of the arrangements represented in FIG. 1 through 3, in a first operating position.

All of the rollers 03; 04; 06; 08; 09; 11; 12; 13; 14 of the inking unit, the rollers 18; 21; 22 of the dampening unit, the stripper roller 17 and the printing couple cylinders 01; 02 are rotatably mounted in side frames 47; 48 of the printing press, as may be seen in FIG. 5. These side frames 47; 48 are positioned spaced from, and opposite one another. At least the ink forme rollers 03; 04; 06 and the dampening forme roller 18, and preferably also the film roller 09 and the ink flow dividing roller 11 of the inking unit, and the dampening distribution roller 21 of the dampening unit, are each situated so as to be capable of radial movement. A radial movement of each of these rollers 03; 04; 06; 09; 11; 18; 21 refers to the fact that the respective axes of each of these rollers 03; 04; 06; 09; 11; 18; 21, or at least one of each of the ends of these rollers 03; 04; 06; 09; 11; 18; 21 can be displaced eccentrically, in relation to a bearing point which is fixed on the frame and which belongs to the respective roller 03; 04; 06; 09; 11; 18; 21. The eccentric displacement of each of the rollers 03; 04; 06; 09; 11; 18; 21 is accomplished preferably with the use of a plurality of actuators 23, such as, for example, four, such actuators which are arranged symmetrically and concentrically around each of the respective axes of these rollers 03; 04; 06; 09; 11; 18; 21, as is represented by way of example in FIGS. 2 and 3. Those actuators 23 that belong to the same roller 03; 04; 06; 09; 11; 18; 21 can preferably be actuated individually and independently of one another via a control unit, and can be adjusted to a specific adjustment path. Each actuated actuator 23 exerts a radial force with respect to the roller 03; 04; 06; 09; 11; 18; 21 to which it belongs. This radial force displaces the axis of its associated roller 03; 04; 06; 09; 11; 18; 21 radially, or at least attempts to displace the roller's axis. When a plurality of actuators 23, which are arranged at the same end of one of the rollers 03; 04; 06; 09; 11; 18; 21, are actuated simultaneously, the radial movement which is executed by the axis of the respective roller 03; 04; 06; 09; 11; 18; 21 results from a vector sum of the respective radial forces of the actuated actuators 23. The actuators 23 may be pressurized, for example, by a pressure medium. They are preferably pneumatically actuated. Each of the actuators 23 is situated, for example, in a roller socket, with each such roller socket accommodating one end of the respective roller 03; 04; 06; 09; 11; 18; 21. The radial movement that can be executed by the axis of a respective roller 03; 04; 06; 09; 11; 18; 21 preferably lies within the range of a few millimeters, such as, for example, within a range of 10 mm, which range is sufficient to disengage the respective roller 03; 04; 06; 09; 11; 18; 21 from at least one adjacent cylindrical rotational body, such as, for example, the forme cylinder 02. The respective actuators 23 are also usable to adjust a contact pressure exerted by the respective roller 03; 04; 06; 09; 11; 18; 21 against its at least one adjacent rotational body. The degree of adjusted contact pressure influences the quality of the printed product which is produced in connection with this inking unit and/or dampening unit, by influencing the transport of ink or dampening agent that is controlled with this adjustment. The contact pressure is built up if there is already direct contact between the respective roller 03; 04; 06; 09; 11; 18; 21 and its adjacent rotational body. With the actuation of one or more actuators 23, the at least one effective radial force can be increased. With the continued or renewed actuation of one or more actuators 23, the amount of existing contact pressure can be adjusted, and can, for example, even be decreased.

With the adjustment of the contact pressure, which is exerted by one of the rollers 03; 04; 06; 09; 11; 18; 21 on its adjacent rotational body, the width of a roller strip that is formed by the direct contact between this roller 03; 04; 06; 09; 11; 18; 21 and the adjacent rotational body is also adjusted. This roller strip is represented as a flattened area on the circumferential surface of the roller 03; 04; 06; 09; 11; 18; 21, alternatively, as a flattened area on the circumferential surface of the cylindrical rotational body that cooperates with the roller 03; 04; 06; 09; 11; 18; 21, or as flattened areas on the circumferential surfaces of both. The width of the roller strip is the chord that is formed as a result of the flattening of the otherwise circular cross-section of the roller 03; 04; 06; 09; 11; 18; 21 or of the rotational body that cooperates with it. The flattening is made possible due to an elastically deformable circumferential surface of the roller 03; 04; 06; 09; 11; 18; 21 or of the circumferential surface of the rotational body that cooperates with it. A roller strip is also referred to as a nip point. In the control unit which controls the actuators 23, values for the respective pressure levels to which the respective actuators 23 are to be adjusted can be stored. This is done in order to form a roller strip of a specific width for a specific roller 03; 04; 06; 09; 11; 18; 21 with its adjacent rotational body, as a result of the contact pressure resulting from the respective adjustment of the actuators for the specific roller and/or its adjacent rotational body.

The printing couple cylinders 01; 02, specifically the transfer cylinder 01 and the forme cylinder 02, are each mounted in a bearing unit 24, according to their respective representation in FIGS. 2 and 3. Each end of each of the respective printing couple cylinders 01; 02 is respectively mounted in a bearing unit 24 of this type. Each such bearing unit 24 allows a linear adjustment path S for the respective printing couple cylinder 01; 02. This adjustment path S is preferably aligned horizontally in the case of a printing couple in which the print substrate is guided substantially vertically. Details of the bearing unit 24 in accordance with the present invention are shown in FIG. 4.

Figure 4:
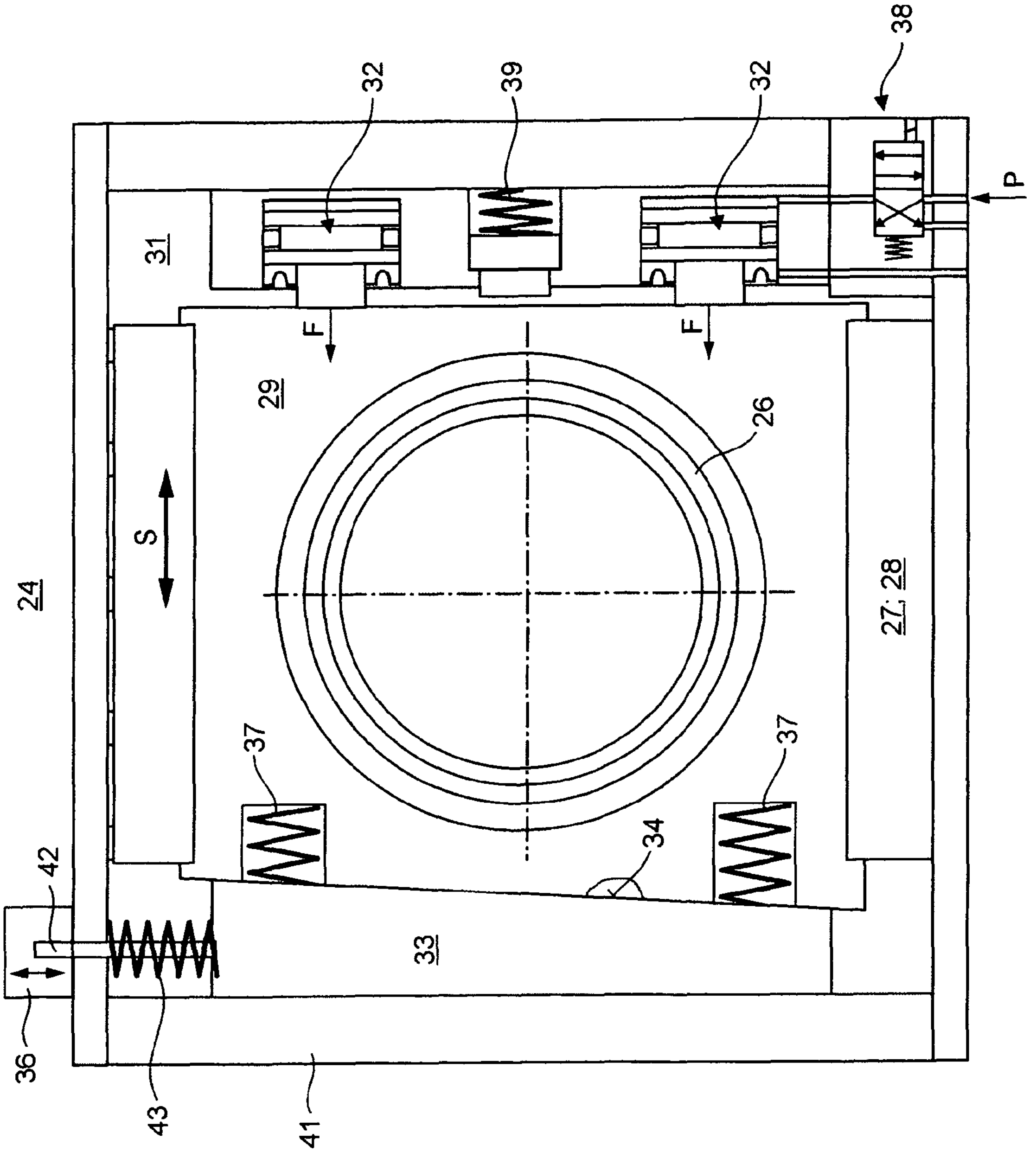
FIG. 4 a sectional representation of a bearing unit of a printing couple cylinder.

In addition to a bearing 26, which may be, for example, a radial bearing 26, and may specifically be, for example, a cylinder roller bearing 26 as is depicted schematically in FIG. 4, for use in the rotary mounting of the respective printing couple cylinder 01; 02, the bearing unit 24, which integrates an engagement/disengagement mechanism for the respective printing couple cylinders 01; 02, comprises bearing elements 27; 28 for utilization to accomplish a radial movement of the respective printing couple cylinder 01; 02, for print-on and/or print-off adjustment. For this purpose, and once it has been installed in or on a frame of the printing press, the bearing unit 24 has fixed bearing elements 27 which are fixed to the frame and to the support, and movable bearing elements 28 which can be moved in relation to these fixed bearing elements 27. The bearing elements 27; 28, which are respectively fixed to the support and movable with respect to the support, are configured as cooperating linear elements 27; 28, forming a linear bearing together with corresponding sliding surfaces or roller elements that are situated between them. Pairs of linear elements 27; 28 hold a bearing block 29 between them. The bearing block 29 is configured, for example, as a sliding carriage 29 and accommodates the radial bearing 26. Bearing block 29 and the movable bearing elements 28 can also be embodied as a single piece. The bearing elements 27, which are fixed to the support, are arranged on a support 31, which will be, or which is connected, as a unit, to one of the side frames 47; 48, as may be see in FIG. 5. The support 31 is configured, for example, as a support plate, which support plate has, for example, an opening that is configured to accommodate a shaft, such as, for example, a drive shaft of a cylinder journal, which is not represented in FIG. 4, and which is situated at least on one drive side of the respective printing couple cylinder 01; 02. The frame panel on the drive side also preferably has a recess or an opening for a drive shaft. On the end surface opposite the drive side, it is not absolutely necessary for a recess or an opening to be provided in the side frame 47; 48, as those side frames 47; 48 are depicted in FIG. 5.

One length of the linear bearing, and especially at least one length of the bearing element 27 of the linear bearing, which, when mounted, is fixed to the frame, is smaller than a diameter of the allocated printing couple cylinder 01; 02, as viewed in the direction of the adjustment path S. The bearing block 29 preferably has only a single degree of freedom of motion in the direction of the adjustment path S. That direction of the adjustment path S is depicted by the double-headed arrow in FIG. 4.

The bearing unit 24 depicted in FIG. 4, which is preferably configured as a component that can be installed as a unit, forms, for example, an optionally partially open housing. Such a housing can be formed from, for example, the support 31 and/or, for example, from a frame, which as may be seen in FIG. 4, includes, for example, the four plates that border the bearing unit 24 on all four sides toward the outside, which four plates are not identified by reference symbols. Inside this housing or this frame, the bearing block 29, with the radial bearing 26, the linear guides 27; 28 and, in an advantageous embodiment, for example, an actuator 32, or a plurality of such actuators 32, which can operate to displace the bearing block in a linear fashion, are housed. The bearing elements 27, which are fixed to the frame, are arranged substantially parallel to one another and define the direction of the adjustment path S, which is depicted in FIG. 4.

A print-on adjustment is performed by moving the bearing block 29 in the direction of the print position, by the utilization of a force F which is applied to the bearing block 29 by at least one actuator 32, and especially by the use of at least one power-controlled actuator 32. Through the use of such an actuator 32, a defined or a definable force F can be applied to the bearing block 29 in the print-on direction for the purpose of adjustment, as may be seen in FIG. 4. The linear force at the respective nip point, which linear force is decisive for ink transfer and therefore for print quality, among other factors, is therefore defined, not by an adjustment path, but instead is defined by the equilibrium of forces between the force F and a linear force $F_L$ which results between the printing couple cylinders 01; 02 and the resulting equilibrium. In a first embodiment, which is not shown separately, the printing couple cylinders 01; 02 are engaged against one another in pairs. This is because the bearing block 29 is acted upon by the correspondingly adjusted force F via the actuator or actuators 32. If multiple printing couple cylinders 01; 02 for example three or four of such printing couple cylinders 01; 02, which are adjacent to one another in direct sequence, and which are cooperating in pairs, are embodied without the possibility of fixing or of limiting the adjustment path S using a purely power-driven adjustment mechanism, then although a system, that has already been adjusted with respect to the necessary pressures, such as linear forces, can be subsequently corrected, an adjustment to the basic setting can be made only with difficulty due to the partially overlapping reactions. For adjusting the basic setting of a system, with corresponding adjustments to the printing couple cylinders 01; 02, one advantageous embodiment therefore provides that at least the respective transfer cylinder 01 of the printing couple can be fixed in place, or at least can be limited in terms of movement, in a position of adjustment which is determined by the equilibrium of forces.

Particularly advantageous is an embodiment of the present invention in which the bearing block 29 is mounted such that it can move in at least one direction away from the print position against a force, such as, for example, against a spring force, and especially against a definable force, even when the printing press is running. In this manner, in contrast to a mere restriction of movement, on one hand a maximum linear force is defined by the cooperation of the cylinders 01; 02, and on the other hand a yielding of one of the cylinders is enabled, which yielding of one of the cylinders may be necessary, for example, in the case of a web tear associated with a paper jam on one of the printing couple cylinders 01; 02.

On its side that faces a print position, the bearing unit 24 has a stop 33. This stop 33 is movable, at least during the adjustment process, and limits the path of adjustment S up to, or towards the print position. The stop 33 can be moved in such a way that a stop surface 34, which stop surface 34 functions as the stop, the reference symbol of which is indicated in FIG. 4 in a cutout area of the bearing block 29, can be varied in at least one area along the path of adjustment S. Thus, in one advantageous embodiment, the adjustable stop 33 represents an adjustment device with which the location of an end position of the bearing block 29, which is close to the print position, can be adjusted. For the restriction of movement/adjustment, a wedge drive, as described below, may be provided, for example. In principle, the stop 33 can be adjusted either manually, or via the provision of an adjustment element 36 embodied as an actuator 36.

Also provided, in an advantageous embodiment of the present invention, is a holding or a clamping element, which is not specifically illustrated in FIG. 4, and with which the stop 33 can be secured in the desired position. Moreover, at least one spring-force element 37, such as, for example, spring element 37, is provided, which spring-force element exerts a force $F_R$ from the stop 33 on the bearing block 29 in a direction which is facing away from the stop. In other words, the spring element 37 effects an adjustment to the print-off position when movement of the bearing block 29 is not impeded in some other way. An adjustment to the print-on position is accomplished by moving the bearing block 29 in the direction of the stop 33 by the use of the at least one actuator 32, and especially by the use of a power-controlled actuator 32, with which actuator 32, a defined or a definable force F can optionally be applied to the bearing block 29 in the print-on direction for the purpose of engaging the respective printing couple cylinder 01; 02. If this actuator-defined force F is greater than a restoring force $F_R$ of the spring elements 37, then, with a corresponding spatial configuration, an engagement of the respective printing couple cylinder 01; 02 against the adjacent printing couple cylinder 01; 02 and/or an engagement of the bearing block 29 against the stop 33 occurs.

Ideally, the applied force F, the restoring force $F_R$ and the position of the stop 33 are selected such that between the stop 33 and the stop surface of the bearing block 29, in the engaged position, no substantial force ΔF is transferred, and such that, for example, $|\Delta F|<0.1*(F-F_R)$, especially $|\Delta F|<0.05*(F-F_R)$, ideally $|\Delta F|\approx 0$. In this case, the engagement force between the printing couple cylinders 01; 02 is essentially determined by the force F that is applied via the actuator 32. The linear force $F_L$ at the respective nip point, which linear force $F_L$ is decisive for ink transfer and therefore for print quality, among other factors, is therefore defined primarily not by an adjustment path S, but, in the case of a quasi-free stop 33, is defined by the force F and the resulting equilibrium. In principle, once the basic adjustment has been determined with the forces F appropriate for this, a removal of the stop 33 or of a corresponding immobilization element, that is effective only during the basic adjustment, would be conceivable.

In principle, the actuator 32 can be embodied as any actuator 32 that will exert a defined force F. Advantageously, the actuator 32 is configured as a positioning element 32 which can be actuated with pressure medium, and is preferably configured as a piston 32 that can be moved by a fluid. Advantageously with respect to a possible tilting, the assembly comprises multiple actuators 32 of this type, in the embodiment depicted in FIG. 4 with two such actuators 32. A liquid, such as oil or water, is preferably used as the fluid due to its incompressibility.

To actuate the actuators 32, which are embodied in this embodiment shown in FIG. 4 as hydraulic pistons 32, a controllable valve 38 is provided in the bearing unit 24. Controllable valve 38 is configured, for example, to be electronically actuable, and places a hydraulic piston in a first position to be pressureless or at least at a low pressure level. In another position of the controllable valve 38, the pressure P, which conditions the force F, is present. In addition, for safety purposes, a leakage line, which is not specifically shown in FIG. 4, is provided.

To prevent excessively long engagement/disengagement paths, while still protecting against web wrap-up, on a side of the bearing block 29 that is distant from the print position, a restriction of movement, by the use of a movable, force-limited stop 39 as an overload protection element 39, such as, for example, in combination with a spring element 39, can be provided. In the operational print-off position, while the pistons 32 are disengaged and/or retracted, this force-limiting stop can serve as a stop 39 for the bearing block 29. In the case of a web wrap-up, or of other excessive forces originating from the print position, the stop will yield and will open up a larger path. A spring force for this overload protection element 39 is therefore selected to be greater than the sum of forces of the spring elements 37. Thus, in operational engagement/disengagement, a very short adjustment path, such as, for example, of only 1 to 3 mm, can be provided.

In the represented embodiment depicted in FIG. 4, the stop 33 is embodied as a wedge 33, which wedge 33 can be moved transversely in relation to the direction of adjustment path S. During the movement of wedge 33, the position of the respective active stop surfaces 34 along the path of adjustment S varies. The wedge 33 is supported, for example, against a stop 41 which is fixed to the support.

The stop 33, which is embodied in the depiction shown in FIG. 4 as wedge 33, can be moved by an actuator 36, such as, for example, by a positioning element 36 which can be actuated with pressure medium. The positioning element 36 can be, for example, a piston 36 which is actuable with a pressure medium, in a working cylinder with dual-action pistons, via a transmission element 42, which may be embodied, for example, as a piston rod 42, or by an electric motor via a transmission element 42 which may be embodied as a threaded spindle. This actuator 36 can be active in both directions, or, as illustrated in FIG. 4, can be configured as a one-way actuator, which, when activated, works against a restoring force provided by a spring 43. For the aforementioned reasons, largely due to the use of a powerless stop 33, the force of the restoring spring 43 is selected to be weak enough that the wedge 33 is held in its correct position against only the force of gravity or against vibrational forces.

In principle, the stop 33 can also be embodied differently. For example, it can be embodied as a ram that can be adjusted and affixed in the direction of adjustment, such that it forms a stop surface 34 for the movement of the bearing block 29 in the direction of the print position. This stop surface is variable in the direction of the adjustment path S and, at least during the adjustment process, can be secured in position. In an embodiment which is not specifically illustrated here, the stop 33 is adjusted, for example, directly parallel to the direction of adjustment path S via a drive element, such as, for example, via a cylinder that is actuable with pressure medium, with dual-action pistons, or with an electric motor.

Figure 6:
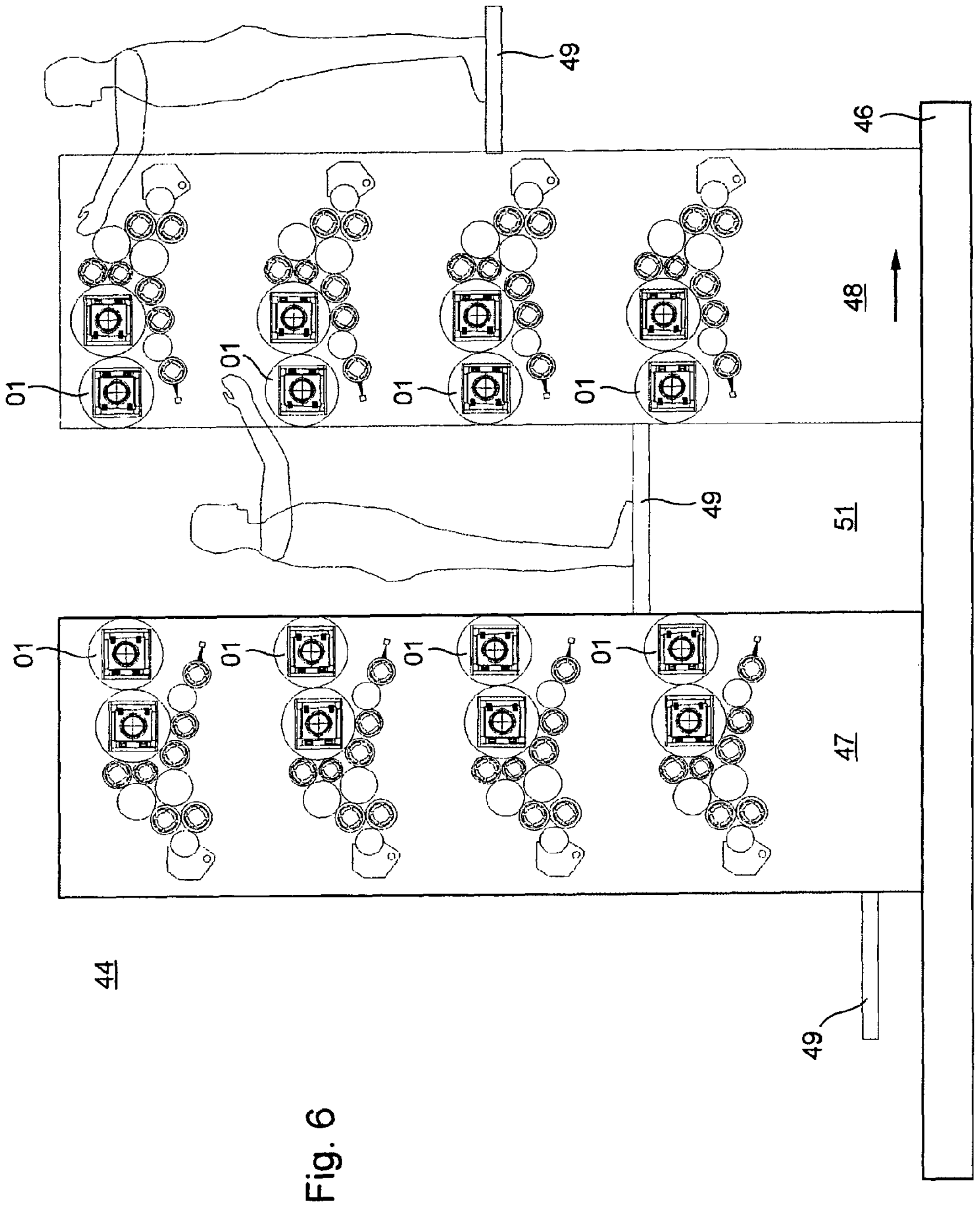
FIG. 6 the printing tower shown in FIG. 5 in a second operating position.

FIG. 5 and FIG. 6 each show a printing tower 44 comprising a plurality of the printing couple arrangements which are presented in FIGS. 1 and 2, for example eight such printing couple arrangements, each of which has cooperating printing couple cylinders 01; 02 that are combined with an inking unit and a dampening unit engaged against the respective forme cylinder 02. In FIG. 5, which shows the printing tower 44 in a first operating position, in each case, two of the arrangements of cooperating printing couple cylinders 01; 02 represented in FIGS. 1 and 2, along with their respective assigned inking units and dampening units, are engaged against one another in a so-called blanket-to-blanket assembly. A nip point between the transfer cylinders 01 of two cooperating printing couples, which are transfer cylinders 01 engaged against one another, represents a print position. Each printing tower 44 has, for example, two pairs of side frames 47; 48, which are arranged spaced from, and opposite one another. In FIG. 5 and in FIG. 6, for each of these pairs of side frames 47; 48 only one of the frame panels, which forms the respective pair, is shown. In each pair of side frames 47; 48 of the printing tower 44 shown in FIGS. 5 and 6, a plurality of the arrangements of cooperating printing couple cylinders 01; 02, for example four, such arrangements of cooperating printing couple cylinders 01; 02, along with their respective assigned inking units and dampening units, are arranged vertically one above another. This arrangement enables the implementation, of for example, a four-color printing process. The print substrate, which is not specifically shown, and which preferably is a material web, is fed through the printing tower 44 between the transfer cylinders 01 which are engaged against one another, preferably from bottom to top, and can thus be printed on both sides simultaneously. The printing tower 44, which is shown in FIGS. 5 and 6, can be a component of a newspaper printing press. Preferably, all of the printing couple cylinders 01; 02 of this printing tower 44 are each mounted in a linearly displaceable bearing unit 24 as shown in FIG. 4. At least all of the forme rollers 03; 04; 06; 18 and preferably also all of the respective film roller 09, the respective ink dividing roller 11 and the respective dampening distribution roller 21 are also each mounted in the manner that is detailed in reference to FIG. 2, so as to be capable of radial movement.

The printing tower 44 is positioned on a base 46. At least one of the pairs of side frames 47; 48 may be capable of moving linearly on the base 46. FIG. 5 shows the first operating position of the printing tower 44, in which both pairs of side frames 47; 48 are engaged against one another. In this first operating position of the printing tower 44, the printing press can produce a printed product, such as, for example, a newspaper. A preferably height-adjustable platform 49 is preferably provided on each outer side of the printing tower 44, and aligned parallel to the longitudinal direction of the printing couple cylinders 01; 02 and rollers 03; 04; 06; 08; 09; 11; 12; 13; 18; 21; 22. This height-adjustable platform 49 is usable to perform manual tasks involving the printing couples.

FIG. 6 shows the printing tower 44, which is represented in FIG. 5 in its first operational position, in a second operating position. The side frame pair 48 has been moved linearly on the base 46 away from side frame pair 47, which, in this example, is represented as stationary. The moved side frame pair 48 has been disengaged from the stationary side frame pair 47, as is also indicated by a directional arrow depicted on the moved side frame pair 48. With the separation of the two pairs of side frames 47; 48 from one another, the transfer cylinders 01, which participate in the print positions, are also disengaged from one another. In addition to the platforms 49 situated on the outer sides of the printing tower 44, which platforms 49 are aligned parallel to the longitudinal direction of the printing couple cylinders 01; 02 and to the rollers 03; 04; 06; 08; 09; 11; 12; 13; 18; 21; 22, a preferably height-adjustable platform 49 can be provided in a passageway 51 which is formed between the two pairs of side frames 47; 48 which have been disengaged from one another. The height-adjustable platform 49 can be provided to enable manual tasks to be performed on the printing couples. The passageway 51 is formed by the disengagement of the one, movable side frame pair 48 from the other, stationary side frame pair 47.

Figure 7:
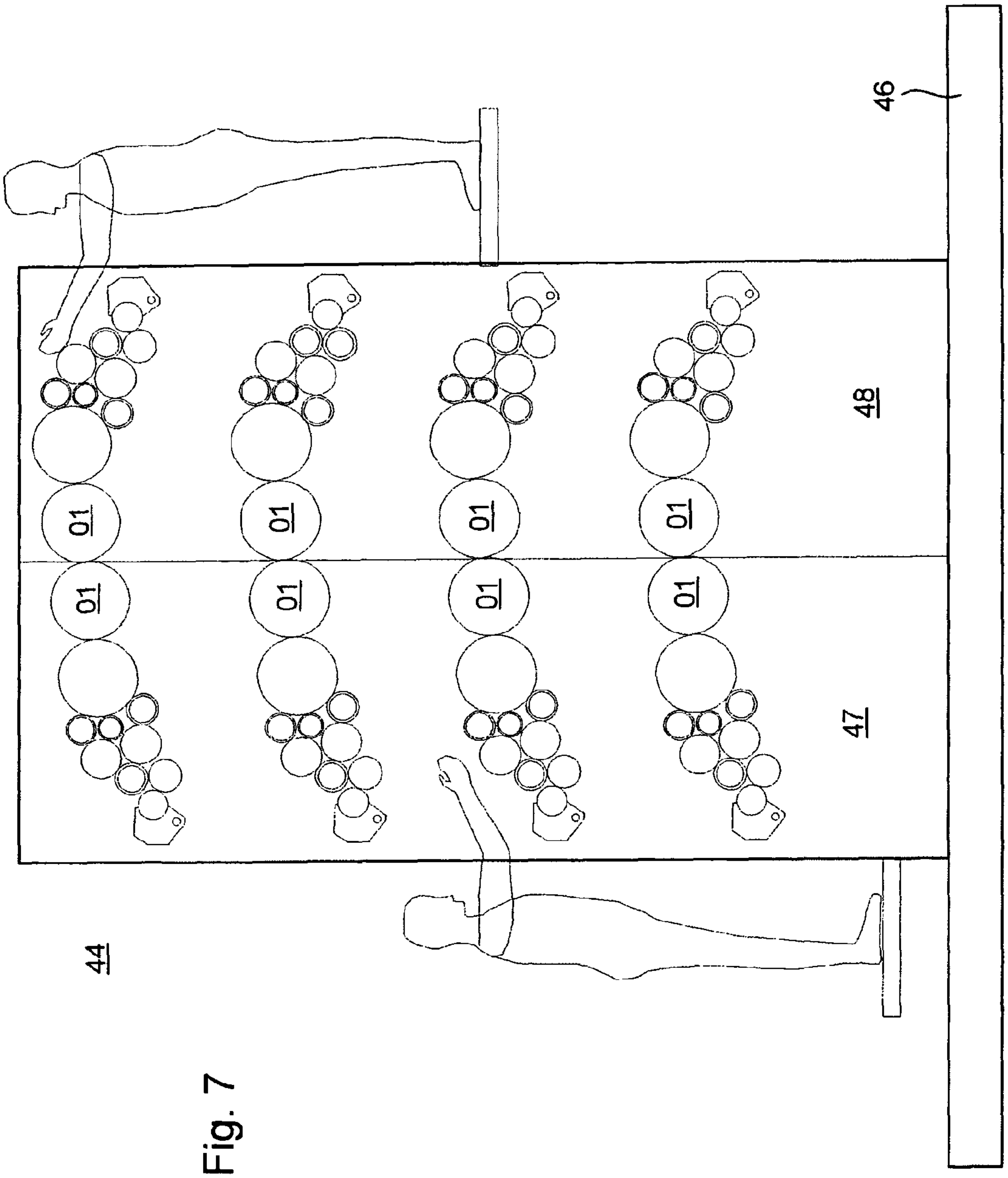
FIG. 7 the printing tower shown in FIG. 5 with printing couples, each without a dampening unit, for use in implementing a dry offset process.

FIG. 7 also shows the printing tower 44 represented in FIG. 5 returned in its first operating position, in which first operating position, the transfer cylinders 01, which are arranged in different pairs of side frames 47; 48 and which form a shared print position, are engaged against one another. In contrast to FIG. 5, however, the printing tower 44 shown in FIG. 7 is intended for executing a dry offset printing process without the use of a dampening agent. Accordingly, the printing tower 44 of FIG. 7 has no dampening units. Solely for purposes of simplicity and clarity, in FIG. 7 the linearly displaceable bearing units 24 which are shown in FIG. 4, and in each of which linearly displaceable bearing units 24 one of the printing couple cylinders 01; 02 of this printing tower 44 is mounted, are not shown. For the same reasons, the bearing assemblies for the ink forme rollers 03; 04; 06, which rollers 03; 04; 06 are also capable of radial movement, and preferably also the bearing assembles for the film rollers 09, and the bearing assembles for the ink dividing rollers 11 of the respective inking units are also not shown in FIG. 7. These bearing assemblies have already been detailed in reference to FIG. 2. Likewise, the pairs of side frames 47; 48 can be structured so as to allow them to be disengaged from one another, as has been detailed, for example, in reference to FIG. 6.

FIG. 8 again shows the printing tower 44 described in reference to FIG. 5. A printing forme magazine 58 is now shown as being assigned to each forme cylinder 02, and is represented, in each case, in an operating position in which it is engaged preferably tangentially on the respective forme cylinder 02. Each such printing forme magazine 58 has at least one first chute 59 for supplying at least one new printing forme to the forme cylinder 02. It preferably also has a second chute 61 for receiving at least one printing forme that has been removed from the forme cylinder 02. Each of the two chutes 59; 61 defines storage positions for at least one printing forme. These chutes 59; 61 are preferably each aligned substantially horizontally, are arranged one above another, and thus are spaced vertically. At an end of the first chute 59, which faces the forme cylinder 02 and which is intended for supplying at least one new printing forme to the forme cylinder 02, for example, at least one lateral stop 62 is provided. This lateral stop 62 can be pivoted into a plane of the printing forme to be supplied. The printing forme, which is to be supplied to the forme cylinder 02, is guided laterally against this lateral stop 62 in order to perform a register-true supply. To secure a printing forme on the circumferential surface of the forme cylinder 02, a contact pressure element 63, such as, for example, a roller element 63, is provided, and is spaced slightly from the forme cylinder 02. This contact pressure element 63 can be engaged against the cylinder, preferably via remote actuation, such as, for example, pneumatically, and temporarily fixes a printing forme, that is to be supplied to the forme cylinder 02, in place during the installation process. The printing forme magazines 58 enable a change of printing formes on the respective forme cylinders 02 in an automated sequence. The setup time, which is required for adjustment to a new print production process, is shortened considerably, as compared with a manual execution of a printing forme change. This benefit increases in importance the greater the number of printing formes which need to be changed simultaneously for a production change. Such a simultaneous change of multiple printing formes is customary in newspaper printing. When each of the eight forme cylinders 02, which are arranged in the printing tower 44, is loaded with printing formes in a 6/2 configuration, and when all of these printing formes must be changed simultaneously for a production change, a total of 96 printing formes must be changed in the printing tower 44, which, in an automated sequence, can be accomplished in less than two minutes.

While a preferred embodiment of a rotary printing press comprising a film roller, in accordance with the present invention, has been set forth fully and completely hereinabove, it will be apparent to one of skill in the art that various changes in, for example, the type of web being printed, the number of printing couples being used, and the like could be made without departing from the true spirit and scope of the present invention, which is to be limited only by the appended claims.

What is claimed is:

1. A zonal inking unit of a rotary printing press comprising:
an ink fountain;
an ink fountain roller adapted to receive a layer of ink, having a rheological behavior, from said ink fountain;
a plurality of ink zones, each of a controllable ink thickness, on said ink fountain roller;
an ink film roller (09) cooperating with said ink fountain roller to receive said ink in said ink zones and to provide said ink to a print substrate during passage of said print substrate through said rotary printing press at a transport speed at least up to 10 m/s, wherein the ink film roller (09) has a structured circumferential surface, the structured circumferential surface of the ink film roller (09) having a hardness of at least 60 Shore D, wherein the structured circumferential surface of the ink film roller (09) having irregularly distributed, open depressions ranging in depth from said surface to a depth of 50 μm to 400 μm, and formed as a stochastic structure by shot peening, said open depressions having a maximum width at said surface of said ink film roller, the open depressions on the structured circumferential surface of the ink film roller (09) forming a maximum vacant space having a ratio of 35% relative to a closed, smooth cylindrical surface of said film roller (09) and forming a relief, which relief is adapted to said rheological behavior on the ink to be transported by said ink film roller.

2. The zonal inking unit according to claim 1, characterized in that the ink film roller (09) has a circumferential surface made of one of a polyamide and a polyacrylate or copper.

3. The zonal inking unit according to claim 2, characterized in that said polyamide is reinforced with glass fibers.

4. The zonal inking unit according to claim 1, characterized in that the circumferential surface of the ink film roller (09) has a hardness of more than 70 Shore D.

5. The zonal inking unit according to claim 1, characterized in that the circumferential surface of the ink film roller (09) has a hardness ranging from 80 to 90 shore D.

6. The zonal inking unit according to claim 1, further including an ink dividing (11).

7. The zonal inking unit according to claim 6, further including a plurality of ink forme rollers (03; 04; 06) are in said zonal inking unit, all of which can simultaneously engage a forme cylinder of the rotary printing press (02).

8. The zonal linking unit according to claim 7, characterized in that an uppermost ink forme roller (06) of said zonal inking unit is situated in such a way that a horizontal tangent (T06) placed on the periphery of said uppermost ink forme roller (06) is located spaced a vertical distance (a06) of at least 50 mm from a horizontal tangent (T02) placed on the periphery of the forme cylinder (02).

9. The zonal inking unit according to claim 8, characterized in that all other rollers (03; 04; 08; 09; 11; 12; 13; 14) belonging to said zonal inking unit are located below the horizontal tangent (T06) placed on the periphery of uppermost ink forme roller (06).

10. The zonal inking unit according to claim 7, characterized in that at least one of said ink film roller (09), said ink dividing roller (11) and/or the said plurality of ink forme rollers (03; 04; 06) are each arranged so as to be capable of radial movement, wherein during the radial movement of these rollers, (03; 04; 06; 09; 11) respective axes of these rollers (03; 04; 06; 09; 11), or at least of one of the ends of these rollers (03; 04; 06; 09; 11), is displaceable eccentrically in relation to a bearing point that belongs to one of the respective rollers (03; 04; 06; 09; 11) and is fixed to a frame of the rotary printing press.

11. The zonal inking unit according to claim 6, characterized in that said ink dividing roller (11) divides an ink flow (A) coming from said ink fountain roller (08) into a primary flow (B) and a secondary flow (C).

12. The zonal inking unit according to claim 11, further including two ink forme rollers (04; 06) in the secondary flow (C), wherein said two ink forme rollers (04; 08) divide the secondary flow (C) into partial flows (D; E).

13. The zonal inking unit according to claim 11, further including a first distribution roller (12; 13) is positioned in the primary flow (B) and a second distribution roller in the secondary flow (C), respectively.

14. The zonal inking unit according to claim 11, characterized in that a doctor roller (14) is engaged against said ink dividing roller (11), and further including a doctor blade (16) positioned on said doctor roller (14).

15. The zonal inking unit according to claim 14, characterized in that said doctor roller (14) engaged against said ink dividing roller (11) is positioned downstream from a point at which said secondary flow (C) branches off in the direction of rotation of the ink dividing roller (11).

16. The zonal inking unit according to claim 6, characterized in that said ink dividing roller (11) is engaged against two distribution rollers in said zonal inking unit (12; 13).

17. The zonal inking unit to claim 16, characterized in that one of said two distribution rollers (12; 13) is driven by a drive (53; 54), which is respectively independent of a drive (51; 52) of a forme cylinder (02) and of a transfer cylinder (01) that cooperates with this forme cylinder in the rotary printing press (02).

18. The zonal inking unit according to claim 16, characterized in that at least one of said two distribution rollers (12; 13) has a circumferential surface made of copper or Rilsan.

19. The zonal inking unit according to claim 6, characterized in that said ink dividing roller (11) has a circumferential surface made of an elastic material.

20. The zonal inking unit according to claim 6, characterized in that said ink dividing roller (11) has a circumferential surface having a hardness ranging from 50 to 80 Shore A.

21. The zonal inking unit according to claim 1, characterized in that only said ink film roller (09) is located between said ink fountain roller (08) which receives said ink from said ink fountain (07) and said ink dividing roller (11).

22. The zonal inking unit according to claim 21, characterized in that ink blades that meter the ink picked up from the ink fountain (07) in said plurality of ink zones are provided on the ink fountain roller (08).

23. The zonal inking unit according to claim 1, wherein said inking unit is engaged against a forme cylinder (02).

24. The zonal inking unit according to claim 23, characterized in that said zonal inking unit has at least three of said ink forme rollers (03; 04; 06).

25. The zonal linking unit according to claim 23, characterized in that said zonal inking unit is configured to be front-loaded.

26. The zonal inking unit according to claim 23, wherein each of two ends of at least one of said forme cylinder (02) and of a transfer cylinder (01) that cooperates with this forme cylinder (02) is mounted in a bearing unit (24), wherein said bearing unit (24) permits a linear adjustment path (S), and further wherein said linear adjustment path (S) is aligned substantially orthogonally to a print substrate imprinted by the transfer cylinder (01).

27. The zonal inking unit according to claim 23, characterized in that said forme cylinder (02) participates in the printing of said print substrate, which is passing through the rotary printing press at said transport speed of at least up to 10 m/s.

28. The zonal inking unit according to claim 1, characterized in that said zonal inking unit is assigned, together with a dampening unit, to a forme cylinder (02), wherein all rollers (18; 21; 22) of the dampening unit are positioned substantially below the forme cylinder (02).

29. The zonal inking unit according to claim 1, characterized in that said zonal inking unit is assigned, together with a dampening unit, to a forme cylinder (02), wherein the dampening unit is embodied as a dampening unit which applies a dampening agent to a dampening distribution roller (21) in a contactless fashion.

30. The zonal inking unit according to claim 1, characterized in that said zonal inking unit is assigned, together with a dampening unit, to a forme cylinder (02), wherein all the rollers (18; 21; 22) of the dampening unit are frictionally driven.

31. The zonal inking unit according to claim 7, further including a stripper roller (17), said stripper roller (17) being engaged simultaneously against one of said plurality of ink forme rollers (03; 04; 06) and against a roller (18; 21; 22) of a dampening unit, which can be engaged against the forme cylinder (02).

32. The zonal inking unit according to claim 31, wherein said stripper roller (17) is engaged against an ink forme roller (03) which is positioned in a primary flow of ink (B).

33. The zonal inking unit according to claim 31, wherein said stripper roller (17) is engaged against a dampening forme roller (18) of the dampening unit.

34. The zonal inking unit according to claim 1, characterized is that the rotary printing press including said zonal inking unit imprints the substrate in a wet offset printing process.

35. The zonal inking unit according to claim 1, characterized in that the rotary printing press including said zonal inking unit is embodied as a newspaper printing press.

* * * * *

UNITED STATES PATENT AND TRADEMARK OFFICE

CERTIFICATE OF CORRECTION

PATENT NO. : 8,001,895 B2
APPLICATION NO. : 12/227589
DATED : August 23, 2011
INVENTOR(S) : Schneider et al.

It is certified that error appears in the above-identified patent and that said Letters Patent is hereby corrected as shown below:

Column 20, claim 7, line 62, before "in", delete "are"; and

Column 21, claim 10, line 12, after "and", delete "/or the".

Signed and Sealed this
Twenty-fifth Day of October, 2011

David J. Kappos
*Director of the United States Patent and Trademark Office*